(12) United States Patent
Bonke

(10) Patent No.: US 10,067,476 B2
(45) Date of Patent: Sep. 4, 2018

(54) METHOD FOR PRODUCING A WATCH GLASS HAVING AT LEAST ONE GEMSTONE

(71) Applicant: Levitation AG, Zug (CH)

(72) Inventor: Michael Bonke, Oberwil bei Zug (CH)

(73) Assignee: Levitation AG, Zug (CH)

( * ) Notice: Subject to any disclaimer, the term of this patent is extended or adjusted under 35 U.S.C. 154(b) by 0 days.

(21) Appl. No.: 15/558,027

(22) PCT Filed: Jun. 30, 2015

(86) PCT No.: PCT/EP2015/064839
§ 371 (c)(1),
(2) Date: Sep. 13, 2017

(87) PCT Pub. No.: WO2016/146204
PCT Pub. Date: Sep. 22, 2016

(65) Prior Publication Data
US 2018/0059622 A1 Mar. 1, 2018

(30) Foreign Application Priority Data
Mar. 13, 2015 (DE) .......................... 10 2015 204 613

(51) Int. Cl.
G04B 47/04 (2006.01)
C03C 27/10 (2006.01)
G04B 39/02 (2006.01)

(52) U.S. Cl.
CPC ............ *G04B 47/042* (2013.01); *C03C 27/10* (2013.01); *G04B 39/02* (2013.01)

(58) Field of Classification Search
CPC ...... G04B 47/042; G04B 39/02; G03C 27/10; A44C 5/003
See application file for complete search history.

(56) References Cited

U.S. PATENT DOCUMENTS

| 1,997,500 A | * | 4/1935 | Swarovski | ............. | A44C 17/04 264/274 |
| RE20,193 E | * | 12/1936 | Swarovski | ............. | A44C 17/04 156/298 |

(Continued)

FOREIGN PATENT DOCUMENTS

| AT | 508838 | 4/2011 |
| CH | 670185 | 5/1989 |

(Continued)

OTHER PUBLICATIONS

International Search Report for Application No. PCT/EP2015/064839 dated Oct. 30, 2015 (English Translation, 3 pages).

*Primary Examiner* — Sean Kayes
(74) *Attorney, Agent, or Firm* — Michael Best & Friedrich LLP

(57) ABSTRACT

The invention relates to a method for producing a watch glass, in which at least one diamond or jewel, or other gemstone is embedded, the method comprising the steps of providing a carrier glass, providing a cover glass, introducing at least one recess into the carrier glass, providing at least one diamond, jewel, or other gemstone, inserting the at least one diamond, jewel, or gemstone into the at least one recess of the carrier glass, placing the cover glass on the carrier glass, and connecting the cover glass to the carrier glass such that an airtight connection point between the cover glass and the carrier glass is formed, which is subject to a suction cup effect. The invention further relates to a watch glass that is produced according to the method of the invention. The invention further relates to a watch having a watch glass according to the invention.

20 Claims, 2 Drawing Sheets

(56) References Cited

U.S. PATENT DOCUMENTS

| | | | | |
|---|---|---|---|---|
| 3,630,014 A * | 12/1971 | Jeannet | G04B 17/00 | |
| | | | 310/36 | |
| 4,473,306 A * | 9/1984 | Lederrey | G04B 47/042 | |
| | | | 368/285 | |
| 4,734,895 A * | 3/1988 | Grosskopf | G04B 47/044 | |
| | | | 368/223 | |
| 4,866,823 A * | 9/1989 | Magnien | A44C 17/043 | |
| | | | 29/10 | |
| 5,119,350 A * | 6/1992 | Delacretaz | A44C 17/0258 | |
| | | | 368/223 | |
| 5,400,304 A * | 3/1995 | Offenstein | G04B 19/106 | |
| | | | 368/281 | |
| 6,491,424 B1 * | 12/2002 | Tardy | G04B 39/00 | |
| | | | 368/283 | |
| 6,618,328 B1 * | 9/2003 | Ellner | G04B 19/30 | |
| | | | 368/278 | |
| 7,114,306 B2 * | 10/2006 | Minaai | C03C 27/06 | |
| | | | 52/786.13 | |
| 7,121,717 B2 * | 10/2006 | Grippo | C04B 41/009 | |
| | | | 368/280 | |
| 7,678,441 B2 * | 3/2010 | Smith | B29C 59/022 | |
| | | | 428/141 | |
| 8,974,113 B1 * | 3/2015 | Chan | G04B 45/0076 | |
| | | | 368/285 | |
| 9,952,559 B2 * | 4/2018 | Dolce | G04B 47/042 | |
| 2005/0270908 A1 * | 12/2005 | Gueissaz | G04D 7/007 | |
| | | | 368/11 | |
| 2010/0017944 A1 * | 1/2010 | Hirschmann | A44C 17/04 | |
| | | | 2/244 | |

FOREIGN PATENT DOCUMENTS

| | | |
|---|---|---|
| DE | 9218539 | 8/1994 |
| EP | 0098240 | 1/1984 |
| EP | 1347349 | 9/2003 |
| FR | 1277762 | 12/1961 |
| FR | 2646759 | 11/1990 |

\* cited by examiner

METHOD FOR PRODUCING A WATCH GLASS HAVING AT LEAST ONE GEMSTONE

FIELD OF THE INVENTION

The invention relates to a method for producing a watch glass in which at least one diamond or jewel or other gemstone is embedded. The present invention also relates to a watch glass of said type.

BACKGROUND OF THE INVENTION

Methods for producing watch glasses with gemstones or jewels inserted into recesses are well known. For example, in a method of said type from EP 1 347 349 A2, two glasses are heated to above the melting point and are thus melted together. This method however has the disadvantage that the shape of the recesses can change as a result of the heating of the glasses. As a result, the stones in the recesses are tilted or displaced. This has the result that the stones lose their clear and distinct alignment and position, which impairs the optical effect of the watch glass. Also, even only a slight tilting or displacement of one or stones can destroy the attractive, simple and homogeneous appearance of a watch glass with multiple gemstones.

SUMMARY OF THE INVENTION

It is an object of the invention to propose a method for producing a watch glass in which at least one diamond or jewel or other gemstone is embedded, by means of which method a firm connection between two glasses is made possible without damaging the optical effect of the stones and of the watch glass.

Said object is achieved by means of a method for producing a watch glass in which at least one diamond or jewel or other gemstone is embedded, which method comprises the steps of providing a carrier glass, providing a cover glass, forming at least one recess into the carrier glass, providing at least one diamond, jewel or other gemstone, inserting the at least one diamond, jewel or gemstone into the at least one recess of the carrier glass, placing the cover glass onto the carrier glass, and connecting the cover glass to the carrier glass such that an air-tight connection point between the cover glass and the carrier glass is formed which involves a suction cup effect. A suction cup effect is to be understood to mean the effect which arises in the case of two surfaces and which would generate a negative pressure if it were attempted to separate one surface from the other surface. By means of the air-tight connection point and the suction cup effect, it is ensured that the cover glass and the carrier glass remain connected to one another in a stable and bubble-free manner. Thus, the alignment of the gemstone in the recess remains unchanged, which gives rise to a high-quality aesthetic appearance, in particular a uniform and harmonious appearance of a watch glass with a multiplicity of gemstones.

Here, the expression "carrier glass" refers to the glass which bears the gemstones, regardless of the arrangement of the glass in the watch glass. Accordingly, for example in the case of a watch glass with an upper and a lower glass, which has gemstones which are arranged in the upper glass, the upper glass is to be understood to be the carrier glass and the lower glass is to be understood to be the cover glass.

According to the invention, the cover glass may preferably have at least one recess.

In the context of the invention, the cover glass may have at least one recess which is aligned with the at least one recess of the carrier glass. It is thus possible for a first part of the gemstone to be arranged in the recess of the carrier glass and for a second part of the gemstone to be arranged in the corresponding recess of the cover glass. In this way, it is possible for each of the two glasses to be of thin form, which is advantageous for the optical effect of the watch glass, in particular if a large gemstone is used. Here, the sum of the thickness of the carrier glass and the thickness of the cover glass at the location of the recess may preferably be greater than the height of the gemstone.

According to the invention, it is furthermore possible for in each case at least one recess to be formed into the carrier glass and into the cover glass, into which recesses in each case one gemstone is inserted. In this context, both glasses carry at least one gemstone. Thus, the cover glass can also be considered as a carrier glass.

According to the invention, the air-tight connection point may preferably be realized by means of the application of a vacuum to the entire arrangement composed of the carrier glass and the cover glass by means of a vacuum chamber or a vacuum furnace, and the subsequent removal of the entire arrangement from the vacuum chamber or the vacuum furnace thus, the air that is situated in the recess and in the intermediate space between the cover glass and the carrier glass is removed. As a result, a vacuum prevails in the recess with the stones situated therein. As a result of the removal of the entire arrangement from the vacuum furnace or the vacuum chamber, the cover glass and the carrier glass are compressed by means of the air pressure, which leads to the two glasses being connected to one another.

It may preferably be provided according to the invention that the entire arrangement is heated at the same time as or after the application of the vacuum. The heating of the entire arrangement facilitates the connection of the carrier glass to the cover glass. The arrangement is preferably heated to a temperature which lies below the melting point and above the softening temperature of the glasses, such that the glasses are softened slightly at the surface without the recess losing its shape. The gemstone is thus positioned in an exact manner.

It is particularly preferable for a maximum heating temperature to be less than or equal to 730° C., preferably 700° C., and for a maximum heating duration to be less than 30 min, preferably 20 min. Furthermore, damage to the gemstone, in particular with regard to its optical effect, is avoided.

It is furthermore advantageous if the maximum heating temperature is reached within 45 min to 60 min., the cover glass and the carrier glass are heated over as short a time as possible. A fast or slow transition to the maximum heating temperature may increase the overall time required to carry out the method, or may adversely affect the characteristics of the glasses and thus the connection thereof to one another.

Furthermore, the method according to the invention comprises the step of cooling. The entire arrangement of the glasses may preferably be called by means of a lehr.

The cooling may preferably be performed in three steps. In this way, and even more stable connection of the glasses 2, 3 is provided. In particular, a first cooling process to a first cooling temperature, preferably of 530° C., is performed over as short a time as possible. The cooling from the maximum heating temperature to the first cooling temperature preferably takes place within approximately 40 to 45 minutes. The first cooling may alternatively also be performed in a vacuum furnace, if the vacuum valve of the vacuum furnace is opened.

The first cooling temperature is preferably held constant for a time period of approximately 17 minutes per millimeter of thickness of the entire arrangement of the glasses.

Consequently, according to the invention, the entire arrangement is cooled uniformly to a second cooling temperature, preferably a second cooling temperature of 480° C., over a time period of approximately 17 minutes per millimeter of thickness of the entire arrangement of the glasses.

Subsequently, the entire arrangement is cooled, within an identical time period to the second cooling process, to a third cooling temperature, which preferably corresponds to room temperature of 20° C.

The durations of the steps of maintaining the first cooling temperature, of the second cooling process and of the third cooling process are preferably equal. In particular, sidesteps are each performed within approximately 17 minutes per millimeter of thickness of the entire arrangement of the glasses.

Here, the second cooling step and the third cooling step must altogether last no longer than 45 minutes.

In this way, the formation of stresses in the watch glass during the cooling can be avoided, such as could otherwise lead to sudden cracking of the watch glass.

According to the invention, as an alternative or additionally to the application of the vacuum to the entire arrangement, it is advantageously possible for the air-type connection point between the cover glass and the carrier glass to be realized by means of the introduction of an intermediate layer between the carrier glass and the cover glass before the placement of the cover glass onto the carrier glass and the pressing-together of the entire arrangement composed of the carrier glass and the cover glass. The provision of an intermediate layer between the cover glass and the carrier glass intensifies the suction cup effect, such that the two glasses are connected to one another with an intense action. With the use of the intermediate layer, heating is thus no longer required, and the method can even be performed at room temperature or in "cold" conditions. The use of an intermediate layer has the further advantage that the method according to the invention can also be used for glasses which have a very high softening temperature, such as for example sapphire glass, which exhibits very high scratch resistance. At such temperatures, the optical effect of the gemstone would be impaired. Furthermore, the use of an intermediate layer can permit or facilitate the connection of glasses which have different chemical and physical structures, such as for example mineral glass and sapphire glass. If the entire arrangement is nevertheless heated in order to assist the connection of the glasses to one another, the presence of the intermediate layer between the two glasses results in a considerable reduction of the maximum required heating temperature.

The intermediate layer may preferably comprise an organic or inorganic connecting or adhesive compound or adhesion layer or an elastic foil. For example, the carrier glass may be sprayed with a thin silicon layer. Surface deviations of the carrier glass and of the cover glass can be compensated by means of the intermediate layer, which leads to a very stable connection of the two glasses.

To permit an even more stable and secure connection of the carrier glass to the cover glass, the intermediate layer is, according to the invention, introduced over an entire common contact surface between the carrier glass and the cover glass. The intermediate layer thus extends as far as an edge of the glasses. Owing to the large contact surface, a large connecting force is available for the connection of the glasses. The contact surfaces to be understood to mean the surface by means of which the carrier glass and the cover glass are actually in contact with one another. The recess is thus not covered by the intermediate layer.

In the case of an intermediate layer being used between the two glasses, a maximum heating temperature of less than or equal to 100° C., preferably 60° C., is advantageous. The heating temperature is considerably lower than the melting point and the softening temperature of the glasses, which also has the effect of protecting the gemstones.

In an expedient refinement of the invention, a surface of the cover glass facing toward the carrier glass and a surface of the carrier glass facing toward the cover glass have identical and complementary curvatures. Thus, in the case of doomed glasses, no air can ingress into the intermediate space between the cover glass and the carrier glass, which could cause a separation of the glasses from one another. The invention is thus not restricted to planar glasses.

The gemstone is advantageously positioned in the recess in an exact manner. The gemstone thus cannot wobble within the recess, whereby an elegant optical effect of the watch glass is achieved.

The present invention also relates to a watch glass which comprises a carrier glass which is equipped with at least one recess, and a cover glass, with at least one diamond, jewel or other gemstone which is inserted into the at least one recess, wherein the cover glass is placed onto the carrier glass and is connected to the carrier glass such that an air-tight connection point between the cover glass and the carrier glass is present which involves a suction cup effect.

The invention thus relates to a watch glass which is produced in accordance with the method according to the invention. Said watch glass is associated with the advantages mentioned above with regard to the method according to the invention.

The present invention also relates to a watch which has a watch glass according to the invention.

BRIEF DESCRIPTION OF THE DRAWINGS

Further details, advantages and features of the present invention will emerge from the following description of exemplary embodiments on the basis of the drawing, in which identical or functionally identical parts are denoted in each case by the same reference designations, and in which.

DETAILED DESCRIPTION

A watch glass 1 according to a first exemplary embodiment of the present invention will be described in detail below with reference to FIGS. 1 to 3.

Figure 1:
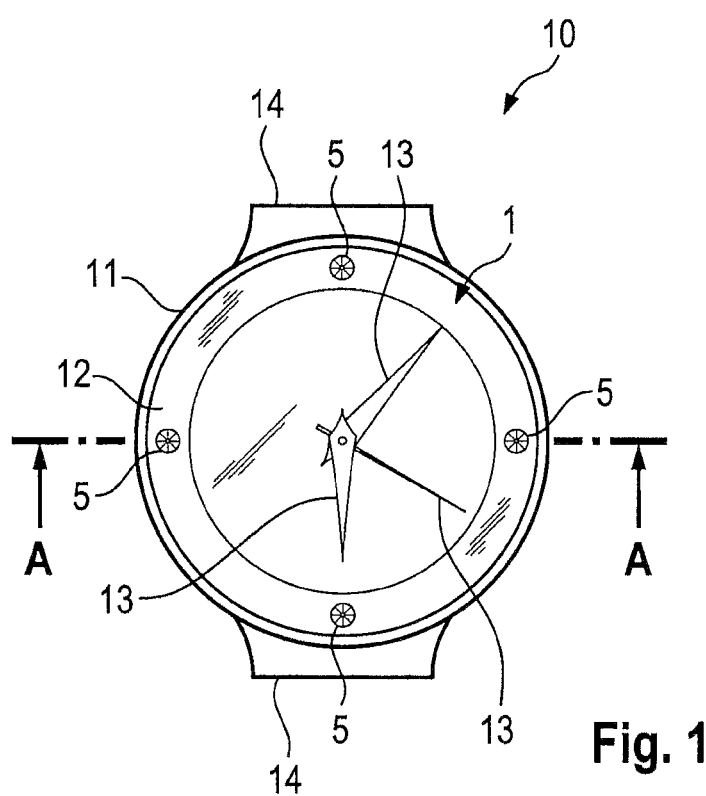
FIG. 1 shows a plan view of a watch, which comprises a watch glass with diamonds.

FIG. 1 shows a watch 10 in the form of a wristwatch with a housing 11 and with a watch glass 1 according to the invention, which watch glass is arranged in the housing 11 and is equipped with gemstones 5. The housing 11 and the watch glass 1 are of circular form, though may have any other suitable shape, such as for example a rectangular, polygonal or other shape. In particular, in this case, four gemstones 5, which are illustrated as diamonds, are arranged in the watch glass 1 with a constant radius and at uniform intervals with respect to one another in the circumferential direction. The position and the number of gemstones 5 may however be selected as desired in accordance with the watch design. For example, it is likewise possible to install one gemstone, two gemstones or 12 gemstones into the watch glass 1. The watch 10 furthermore has a clock face 12 which is formed for example from gold leaf, and three clock arms 13 for displaying the hours, minutes and seconds, and two connectors for a watch strap 14.

Figure 2:
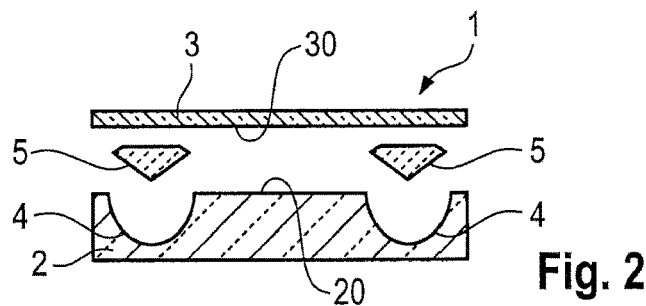
FIG. 2 shows a highly simplified, schematic sectional view of a watch glass composed of a cover glass and a carrier glass according to a first exemplary embodiment of the present invention in the non-assembled state.

FIG. 2 is a highly simplified, schematic view of a section A-A of the watch glass 1 from FIG. 1 in the non-assembled state. The watch glass 1 has a carrier glass 2 and a cover glass 3. The carrier glass 2 and the cover glass 3 are formed from the same glass type, in particular mineral glass. Other glass types may also be used. It is possible in the context of the invention to combine different glass types.

In the carrier glass 2 there are arranged recesses 4 which serve for accommodating gemstones 5. The cover glass 3 and the carrier glass 2 are of circular form and have the same diameter. The glasses 2, 3 differ in terms of their thickness, wherein the cover glass 3 is of relatively thin form. It is however also possible for the two glasses 2, 3 to have the same thickness. Furthermore, an inner surface 20 of the carrier glass 2 and an inner surface 30 of the cover glass 3 are of planar form at the contact point of the two glasses 2, 3. In an alternative embodiment, it is however also possible for the inner surfaces 20, 30 to have identical and complementary curvatures.

Figure 3:
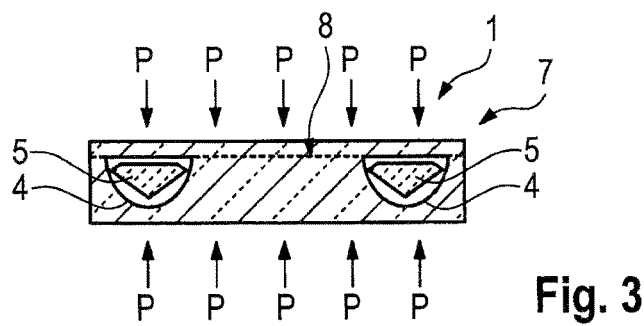
FIG. 3 shows a highly simplified, schematic sectional view of the watch glass according to the invention from FIG. 2 in the assembled state.

The fully manufactured watch glass 1 is shown in FIG. 3. Here, the carrier glass 2 and the cover glass 3 have been connected to one another and thus, in the assembled state, form a glass unit 7. In the assembled state, the two glasses 2, 3 bear closely against one another such that they are visually no longer distinguishable to a viewer. Thus, there is a seamless, air-tight connection point 8 around the recesses 4.

The method according to the invention for producing the watch glass 1 according to FIGS. 2 and 3 will be described below.

Firstly, the carrier glass 2 and the watch glass 3 are provided, and recesses 4 are formed into the carrier glass 2, for example by means of a laser. The gemstones 5, which are provided in the desired shape and size, are then inserted into the recesses 4. The cover glass 3 is placed onto the carrier glass 2, and the entire arrangement composed of the two glasses 2, 3 is subsequently inserted into a vacuum furnace (not shown).

In the vacuum furnace, a vacuum is applied to the entire arrangement. A vacuum of less than 0.01 bar is preferably used. Instead of a vacuum furnace, it is also possible for a vacuum chamber to be used. The application of the vacuum causes the air situated in the recesses 4 and in the intermediate space between the carrier glass 2 and the cover glass 3 to be removed. The recesses 4 thus serve as vacuum chambers.

At the same time, the entire arrangement composed of the cover glass 3 and the carrier glass 2 is heated to a temperature which lies above the softening temperature and below the melting point of the glasses 2, 3. It can thus be ensured that the recesses 4 formed into the carrier glass 2 are not deformed.

The maximum heating temperature should preferably be reached as quickly as possible. In particular, the entire arrangement is heated to a maximum heating temperature of approximately 700° C. Thus, a perfect connection of the carrier glass 2 to the cover glass 3 is made possible.

The heating temperature should preferably increase from room temperature to the maximum heating temperature within approximately 45 minutes to 60 minutes. With such a temperature profile, thermal shock of the glasses 2, 3 in the case of a very fast increase in the temperature is avoided.

The maximum heating temperature is then maintained for approximately 20 minutes. As a result, the glasses 2, 3 are softened to the extent required to facilitate the connection thereof to one another without damaging the gemstones 5.

The vacuum acting on the entire arrangement is thereafter dissipated by virtue of the entire arrangement being removed from the vacuum furnace. For this purpose, a vacuum valve of the vacuum furnace is opened, wherein the pressure in the vacuum furnace increases to atmospheric pressure within a short time. The glasses 2, 3 that have softened as a result of the heating are pressed together by the atmospheric pressure prevailing outside the vacuum furnace, because negative pressure prevails in the recesses 4. This results in the connection of the cover glass 3 to the carrier glass 2, such that a common glass unit 7 is formed.

Furthermore, the entire arrangement or the glass unit 7 is cooled. For the cooling, the glass unit 7 is removed from the vacuum furnace and is placed into a lehr. This has the advantage that, in the case of mass production of watch glasses, the vacuum furnace is available for the next batch. The cooling is performed in a monitored manner and may preferably be performed in three steps. An even more stable connection of the two glasses 2, 3 is thus provided. In particular, a first cooling process to a first cooling temperature, preferably a 530° C., is performed in as short a time as possible. The cooling from the maximum heating temperature to the first cooling temperature preferably takes place within approximately 40 to 45 minutes.

The cooling of the entire arrangement may alternatively also be performed in the vacuum furnace, if the vacuum valve of the vacuum furnace is opened. This may be particularly advantageous for the production of a relatively small number of watch glasses. After the vacuum furnace is opened, the vacuum furnace, flooded with air, serves merely as a lehr. Natural cooling of the furnace takes place here.

The first cooling temperature is preferably, in the case of a total thickness of the two glasses 2, 3 of 2 mm, kept constant for a time period of approximately 34 minutes. Consequently, the entire arrangement is cooled uniformly to a second cooling temperature, preferably to a second cooling temperature of 480° C., over a time period of approximately 34 minutes. Subsequently, the entire arrangement is cooled within an identical time period to a third cooling temperature, which preferably corresponds to room temperature of 20° C.

The pressing-together of the cover glass 3 and the carrier glass 2 owing to the atmospheric pressure (illustrated in FIG. 3 by arrows P) in combination with the cooling of the entire arrangement leads to fusing of the two glasses 2, 3 together, whereby a stable watch glass with a very high-quality and elegant optical effect is produced.

Figure 4:
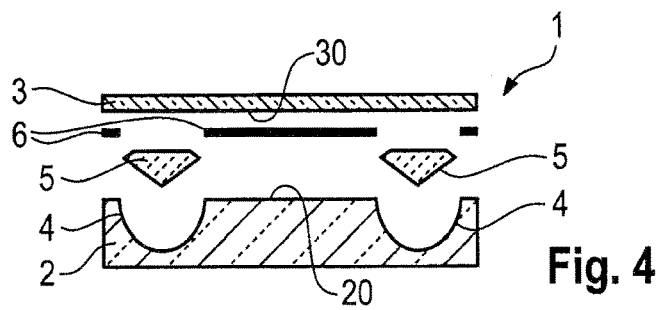
FIG. 4 shows a highly simplified, schematic sectional view of a watch glass composed of a cover glass and a carrier glass according to a second exemplary embodiment of the present invention in the non-assembled state.
Figure 5:
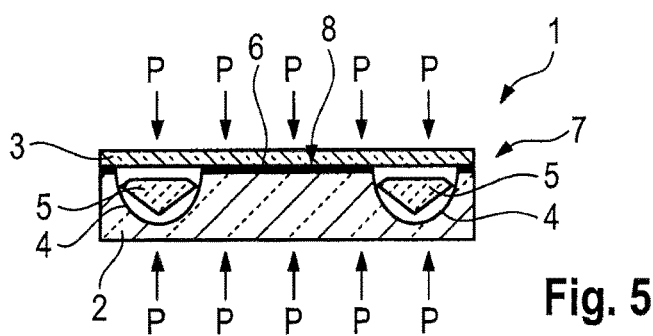
FIG. 5 shows a highly simplified, schematic sectional view of the watch glass according to the invention from FIG. 4 in the assembled state.

A watch glass 1 according to a second exemplary embodiment of the present invention will be described in detail below with reference to FIGS. 4 and 5.

The watch glass 1 of the second exemplary embodiment basically differs from the first exemplary embodiment in that an intermediate layer 6 is applied between the cover glass 3 and the carrier glass 6 before the cover glass 3 is placed onto the carrier glass 2. The intermediate layer 6, which may be in the form of an organic or inorganic connecting or adhesive compound or adhesion layer or in the form of elastic foil is introduced over the entire contact surface between the two glasses 2, 3. As a result of the pressing of the glasses 2, 3 together by the air pressure, the intermediate layer 6 is pressed against the glasses with such intensity that an inflow of air into the recesses 4 is prevented. This yields an error-tight connection point 8 between the carrier glass 2 and the cover glass 3. By contrast to the first exemplary embodiment, the carrier glass 2 and the cover glass 3 are connected to one another via the intermediate layer 6 and not directly. The intermediate layer 6 is however not visually evident to a viewer owing to its small thickness and its optical characteristics and the high pressure that presses the two glasses 2, 3 together. For illustrative purposes, the intermediate layer 6 is illustrated on an enlarged scale in FIGS. 4 and 5.

As a result of the provision of the intermediate layer 6, which intensifies the suction cup effect that is generated, the entire arrangement can be heated to a maximum heating temperature lower than the softening temperature of the glasses 2, 3. The glasses 2, 3 are preferably heated to a heating temperature of less than 100° C., in particular to 60° C. The production process may advantageously even be performed at room temperature. It is thus possible to dispense with a vacuum furnace or with additional heating means at a vacuum chamber, whereby a cost saving can be achieved in the implementation of the method.

In addition to the above written description of the invention, reference is hereby explicitly made, for the additional disclosure thereof, to the diagrammatic illustration of the invention in FIGS. 1 to 5.

Various features of the invention are set forth in the following claims.

The invention claimed is:

1. A method for producing a watch glass in which at least one diamond or jewel or other gemstone is embedded, the method comprising:
   providing a carrier glass:
   providing a cover glass:
   forming at least one recess into the carrier glass:
   providing at least one diamond, jewel or other gemstone:
   inserting the at least one diamond, jewel or gemstone into the at least one recess of the carrier glass:
   placing the cover glass onto the carrier glass: and
   connecting the cover glass to the carrier glass such that an air-tight connection point between the cover glass and the carrier glass is formed which involves a suction cup effect.

2. The method of claim 1, wherein the air-tight connection point is realized by applying a vacuum to an entire arrangement composed of the carrier glass and the cover glass via a vacuum chamber or a vacuum furnace, and subsequently removing of the entire arrangement from the vacuum chamber or the vacuum furnace.

3. The method of claim 2, further comprising heating the entire arrangement at the same time as or after the application of the vacuum.

4. The method of claim 3, wherein a maximum heating temperature is less than or equal to 730° C., and a maximum heating duration is less than 30 minutes.

5. The method of claim 4, wherein the maximum heating temperature is reached within 60 minutes.

6. The method of claim 3, where a maximum heating temperature is less than or equal to 700° C., and a maximum heating duration is less than 20 minutes.

7. The method of claim 1, wherein the air-tight connection point between the cover glass and the carrier glass is realized by introducing an intermediate layer between the carrier glass and the cover glass before placing the cover glass onto the carrier glass and connecting the carrier glass to the cover glass.

8. The method of claim 7, wherein the intermediate layer comprises at least one of an organic or inorganic connecting or adhesive compound, an adhesion layer, or an elastic foil.

9. The method of claim 8, wherein the intermediate layer is introduced over an entire common contact surface between the carrier glass and the cover glass.

10. The method of claim 9, wherein a maximum heating temperature is less than or equal to 100° C.

11. The method of claim 7, wherein the intermediate layer is introduced over an entire common contact surface between the carrier glass and the cover glass.

12. The method of claim 7, wherein a maximum heating temperature is less than or equal to 100° C.

13. The method of claim 7, wherein a maximum heating temperature is less than or equal to 60° C.

14. The method of claim 1, wherein a surface of the cover glass facing toward the carrier glass and a surface of the carrier glass facing toward the cover glass have identical and complementary curvatures.

15. A watch glass comprising:
   a carrier glass equipped with at least one recess; and
   a cover glass, with at least one diamond, jewel or other gemstone inserted into the at least one recess;
   wherein the cover glass is placed onto the carrier glass and is connected to the carrier glass such that an air-tight connection point between the cover glass and the carrier glass is present which involves a suction cup effect.

16. The watch glass of claim 15, wherein a negative pressure exists between the carrier glass and the cover glass.

17. The watch glass of claim 15, further comprising an intermediate layer between the carrier glass and the cover glass.

18. The watch glass of claim 17, wherein the intermediate layer comprises at least one of an organic or inorganic connecting or adhesive compound, an adhesion layer, or an elastic foil.

19. The watch glass of claim 17, wherein a surface of the cover glass facing toward the carrier glass and a surface of the carrier glass facing toward the cover glass have identical and complementary curvatures.

20. The watch glass of claim 15, wherein a surface of the cover glass facing toward the carrier glass and a surface of the carrier glass facing toward the cover glass have identical and complementary curvatures.

* * * * *